United States Patent [19]
Dieringer

[11] 3,946,284
[45] Mar. 23, 1976

[54] CIRCUIT FOR CONTROLLING DAMP SHOCK LOADING

[75] Inventor: Andrew M. Dieringer, Waterford, Wis.

[73] Assignee: Rexnord, Inc., Milwaukee, Wis.

[22] Filed: Aug. 19, 1974

[21] Appl. No.: 498,308

[52] U.S. Cl. ............ 317/123; 251/129; 317/135 A; 317/141 S; 318/611
[51] Int. Cl.² ...................................... H01H 47/32
[58] Field of Search......... 251/129, 131; 317/135 A, 317/141 S, 123, DIG. 4, DIG. 7; 318/596, 611, 621, 623, 624, 620, 696, 672, 681

[56] References Cited
UNITED STATES PATENTS

| | | |
|---|---|---|
| 3,388,300 | 6/1968 | Allmark et al.................. 317/DIG. 7 |
| 3,709,253 | 1/1973 | Spangenberg....................... 251/129 |
| 3,729,666 | 4/1973 | Kelly................................... 318/611 |
| 3,795,285 | 3/1974 | Scholl et al......................... 318/621 |

Primary Examiner—J. D. Miller
Assistant Examiner—Harry E. Moose, Jr.
Attorney, Agent, or Firm—Kinzer, Plyer, Dorn & McEachran

[57] ABSTRACT

This is concerned with an electric circuit for controlling or damping the shock loading on the structural components and parts of machinery which are moved by a conventional hydraulic cylinder. It is more specifically concerned with a control circuit to be used with a proportional control valve so that the mass moved by the cylinder will be gradually accelerated and decelerated to avoid abrupt starts and stops.

2 Claims, 3 Drawing Figures

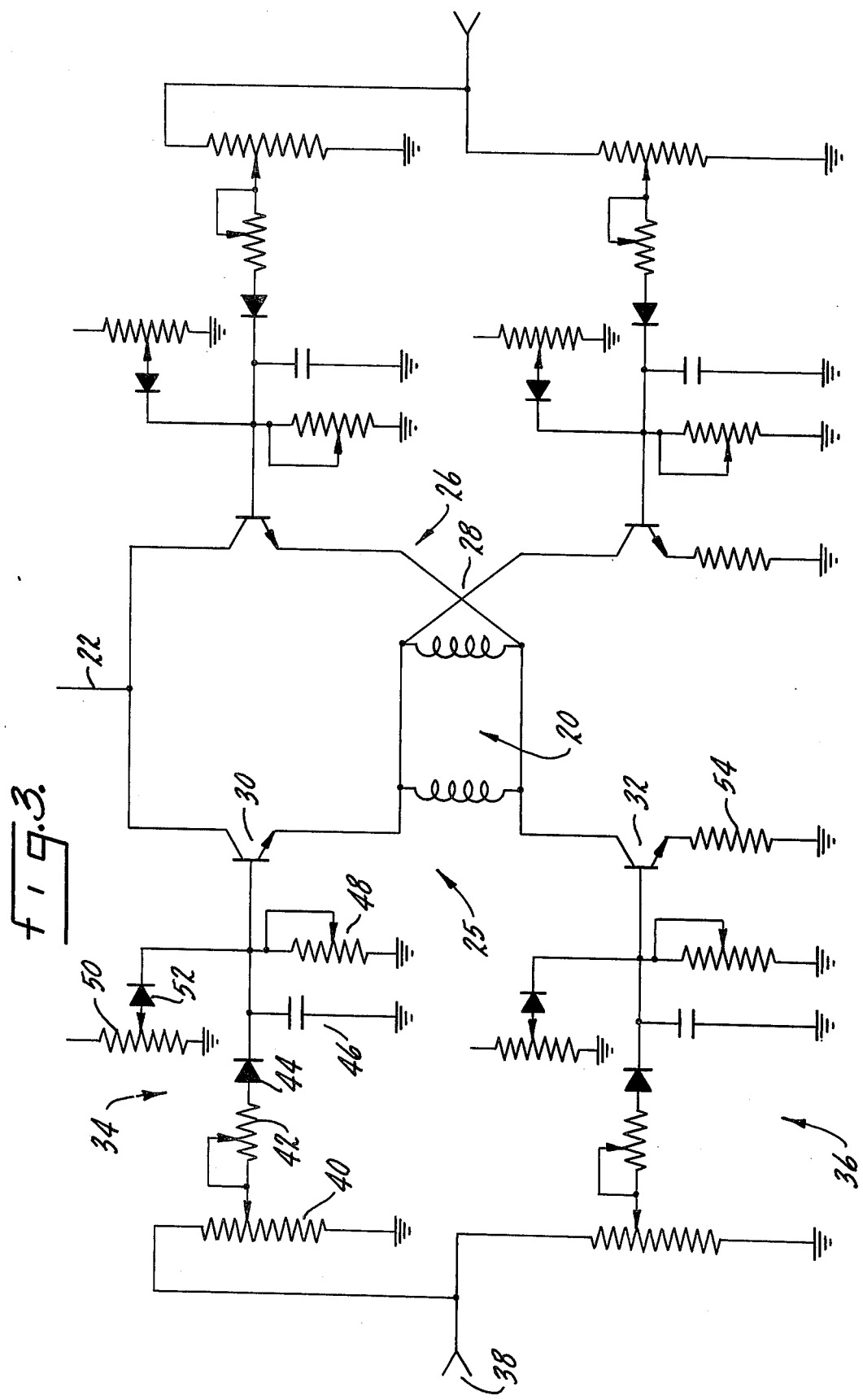

CIRCUIT FOR CONTROLLING DAMP SHOCK LOADING

SUMMARY OF THE INVENTION

This invention is concerned with a circuit and control for eliminating or reducing the shock loading that normally occurs in the structural parts of machinery when various components are moved hydraulically.

A primary object of the invention is a combination control circuit and proportional control valve arrangement which will gradually accelerate and decelerate the movement of a hydraulic cylinder when moving a large mass.

Another object is a control circuit of the above type which does not require any special parts or components.

Another object is a circuit for the above purpose which is simple and reliable.

Another object is a circuit of the above type which is constructed to drive the load or mass in both directions.

Another object is a circuit of the above type which will gradually accelerate a load from a standstill and will gradually decelerate the load when stopping so that the shocks and vibrations caused by abrupt starts and stops will be eliminated thereby reducing wear and tear on the hydraulic circuit and the structural components of the equipment.

Other objects will appear from time to time in the ensuing specification and drawings.

BRIEF DESCRIPTION OF THE DRAWINGS

FIG. 3 is the control circuit.

DESCRIPTION OF THE PREFERRED EMBODIMENT

Figure 1:
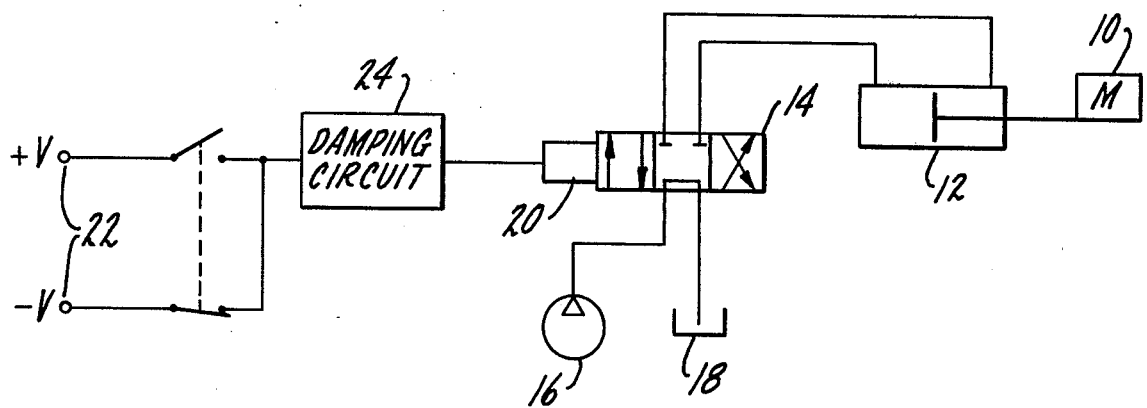
FIG. 1 is a schematic of the load, control valve and circuit.

In FIG. 1 the over-all circuit and control has been schematically indicated in which a large mass 10 indicates the heavy part of a machine, such as a working arm or pivoted extension, is to be moved in both directions by a double-acting hydraulic cylinder 12 controlled and turned by a valve 14 with the usual source 16 of hydraulic fluid and return sump 18. The valve 14 is a proportional control valve of any well known type constructed to control the hydraulic fluid flow in proportion to the current or voltage applied to its coil 20. The electric circuit to the coil from the usual source 22 includes a damping circuit 24 which is shown and explained in detail in FIG. 3 where the current source is indicated at 22 and the coil for the proportional control valve at 20.

In FIG. 3 the circuitry is doubled up because the valve coil 20 must be driven in both directions. Thus the circuit 25 on the left side drives it in one direction and the circuit 26 on the right side drives the valve in the other direction due to cross-connections 28. Two coils have been shown as a part of 20 which is due merely to the type of valve presently being used. And the load 20 could be a single coil.

Since the two sides 25 and 26 may be the same, only one side will be explained in detail.

Considering the side 25, between the source 22 and the load is a transistor 30 with another transistor 32 between the load 20 and ground. A bias is applied to the base of each transistor by separate circuits, the upper one being designated 34 and the lower one 36, from a source 38 which, if the voltages are the same, which they may be, can be the same as source 22. Since the upper and lower circuits 34 and 36 may be the same, only the upper one will be described with the differences being pointed out later.

Considering 34, first the current goes to a pot to ground 40, then to a pot that is wipered to itself at 42, then through a diode 44, then an RC circuit which includes a capacitor to ground 46, with a capacitor 48 wipered to itself, then into the base of the transistor 30. Another pot or variable resistor 50 may be connected from a source through a diode 52 and then into the circuit if the valve is of a type that has, for example, a dead band in the center. This circuit applies a bias to prevent a time lag in the operation of the valve.

The lower circuit 36 may be the same except for the presence of an emitter resistor 54.

Figure 2:
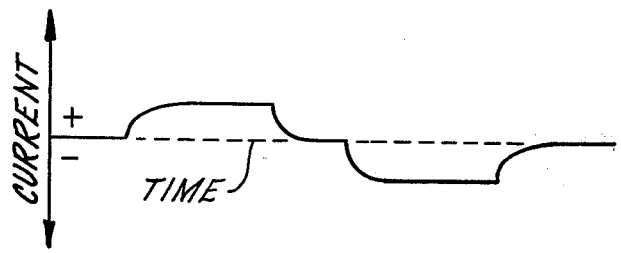
FIG. 2 is a diagram of the wave form.

The device operates as follows: When an input signal is applied at 38, the upper and lower capacitors 46 start charging up so that the signal to the base of the transistors will increase gradually, which results in the valve opening at a rate in proportion to which the transistor is charged. This, of course, is determined by the time constant of the RC circuit 46,48, which gives the rate at which the transistors 30 and 32 open. A transistor is used both ahead and behind the load because they will not open or operate simultaneously, which is due to the characteristics of the individual transistors. So one is used to control the leading edge of the current and the other one to control the drop-off or trailing edge. The wave form is shown diagrammatically in FIG. 2 with currents plotted against time and instead of a right angle curve, the voltage curve ramps up to a certain value and then ramps down. When the current is shut off, the capacitors 46 will unload through their resistors 48 along a slope which gradually reduces the bias on the base of the transistors 30 and 32. In theory the ramps would be at 45° but in reality it's a slope. The negative wave form is also shown in FIG. 2, which would be when the load is driven in the opposite direction by the circuit on the right side of FIG. 3.

While the preferred form and several variations of the invention have been shown or described, it should be understood that suitable additional modifications, changes, substitutions and alterations may be made without departing from the invention's fundamental theme.

The embodiments of the invention in which an exclusive property or privilege is claimed are defined as follows:

1. A circuit for use with a hydraulic cylinder for moving a load, a proportional control valve with a coil adapted to control the flow of hydraulic fluid between a fluid source and the cylinder, a power circuit connected to the coil for providing current from a power source through the coil to ground, a transistor in the circuit on each side of the coil, a control circuit connected to the transistors for applying an input to the base of each of the transistors, and an RC circuit in the control circuit to load and unload during the signal to increase and decrease the bias on the base of the transistor so that current flow to the valve will gradually increase when applied and gradually decrease when cut off.

2. The structure of claim 1 further characterized by and including duplicate power and control circuits connected oppositely to the coil to operate the valve and cylinder in opposite directions.

* * * * *